(12) United States Patent
Horii et al.

(10) Patent No.: US 6,503,615 B1
(45) Date of Patent: Jan. 7, 2003

(54) WIPING CLEANER

(75) Inventors: Takashi Horii, Fukuoka (JP); Masahiro Fukuyama, Aichi (JP); Akira Mizukami, 15-31, Wajirogaoka 3-chome, Higashi-ku, Fukuoka-shi (JP)

(73) Assignees: Inoac Corporation, Aichi (JP); Akira Mizukami, Fukuoka (JP)

( * ) Notice: Subject to any disclaimer, the term of this patent is extended or adjusted under 35 U.S.C. 154(b) by 0 days.

(21) Appl. No.: 09/572,462

(22) Filed: May 17, 2000

(51) Int. Cl.$^7$ .................................................. B32B 3/00
(52) U.S. Cl. .................. 428/316.6; 15/244.1; 15/244.4; 544/200; 528/254
(58) Field of Search ...................... 428/316.6; 15/244.1, 15/244.4; 544/200; 528/254

(56) References Cited

U.S. PATENT DOCUMENTS 4,812,368 A * 3/1989 Scherzer et al. ............ 428/332
5,219,648 A * 6/1993 Morimoto et al. ......... 428/316.6

FOREIGN PATENT DOCUMENTS

| JP | 53-17697 | 2/1978 | ........... C08G/18/14 |
| JP | 2-50943 | 11/1990 | ............... C08J/9/12 |
| JP | 7-157590 | 6/1995 | ............... C08J/9/14 |

* cited by examiner

Primary Examiner—Terrel Morris
Assistant Examiner—Leanna Roché
(74) Attorney, Agent, or Firm—Sughrue Mion, PLLC

(57) ABSTRACT

Disclosed is a wiping cleaner comprising a porous material of an open-cell structure having a density of 5 to 50 kg/m$^3$, a tensile strength of 0.6 to 1.6 kg/cm$^2$, an elongation at break of 8 to 20%, and cell number of 80 to 300 cells/25 mm and having a surface wherein upon wiping, particles are peeled from the wiping surface by friction.

10 Claims, 2 Drawing Sheets

WIPING CLEANER

FIELD OF THE INVENTION

The present invention relates to a wiping cleaner to be used for wiping off stains from the surface of an automobile body, furniture or other article.

BACKGROUND OF THE INVENTION

Conventionally, a dust cloth has been used as a wiping cleaner (also called cleaner) for furniture such as desk, while a wiping cleaner (cleaner) made of flexible urethane foam or cellulose sponge has been used widely for cleaning of tableware or bath tub. These wiping cleaners are first soaked in water or a detergent solution, and then rub off the stains from the surface to be cleaned.

The dust cloth is however accompanied with the problems that it is not so effective for rubbing off stubborn stains such as oil; when used for dry wiping of an automobile body, it hardly removes its stains; and when soaked in water for wiping stains from an automobile body or furniture, dust can be removed but a trace of wiping remains clearly and moreover, strongly stuck stains cannot be removed. The wiping cleaner made of a flexible urethane foam or cellulose sponge is, on the other hand, accompanied with the problems that not only it does not exhibit cleaning effects upon wiping without being soaked in a liquid such as water or detergent solution, that is, dry wiping, but also it presumably scratches the surface to be cleaned; and even if it is soaked in a liquid, it cannot remove stubborn stains such as oil even by strong rubbing. A dust cloth made of a nonwoven cloth soaked in a chemical is put on the market, but it is not sufficiently effective against stubborn stains such as oil.

SUMMARY OF THE INVENTION

With the foregoing in view, the present invention has been completed.

An object of the present invention is to provide a wiping cleaner which can remove stains sufficiently even without being soaked in a liquid, is highly effective for removing stubborn stains, and when soaked in a liquid, exhibits superior cleaning effects without leaving any definite wiping trace.

In one aspect of the present invention, there is thus provided a wiping cleaner comprising a porous material of an open-cell structure having a density of 5 to 50 kg/m$^3$, a tensile strength of 0.6 to 1.6 kg/cm$^2$, an elongation at break of 8 to 20% and cell number of 80 to 300 cells/25 mm and has a surface to be peeled in the particles by the friction upon wiping.

In another aspect of the present invention, there is also provided the above-described wiping cleaner, wherein the material is a melamine resin foam. In a further aspect of the present invention, there is also provided the above-described wiping cleaner, further comprising 1 to 60 parts by weight of an anionic surfactant per 100 parts by weight of the melamine resin foam. In a still further aspect of the present invention, there is also provided the above-described wiping cleaner, further comprising a detergent assistant.

In a still further aspect of the present invention, there is also provided a wiping cleaner comprising a melamine resin foam and a grip fixed thereto, wherein the outer side of the melamine foam not to be fixed with the grip serves as a wiper. In a still further aspect of the present invention, there is also provided the wiping cleaner, wherein the grip is made of an elastic foam having higher strength than that of the melamine foam.

DETAILED DESCRIPTION OF THE INVENTION

Figure 1:
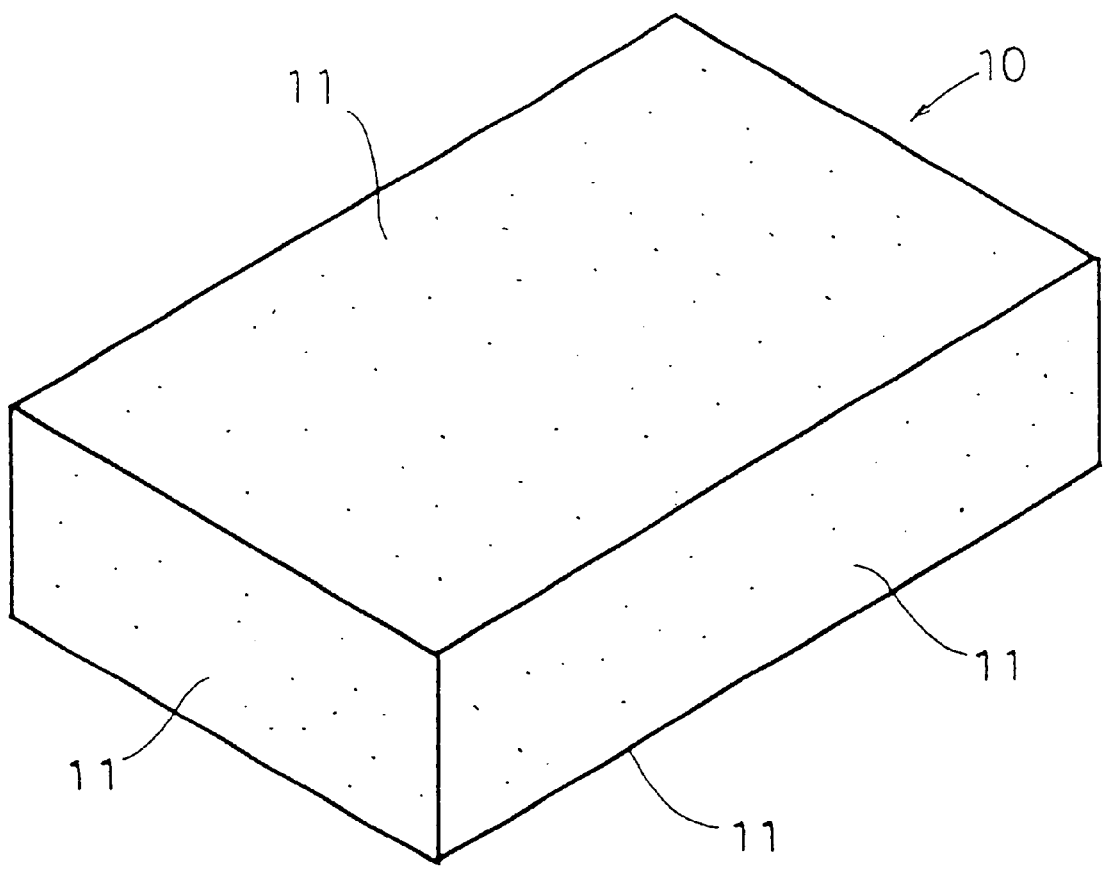
FIG. 1 is a perspective view illustrating a wiping cleaner according to one example of the present invention.
Figure 2:
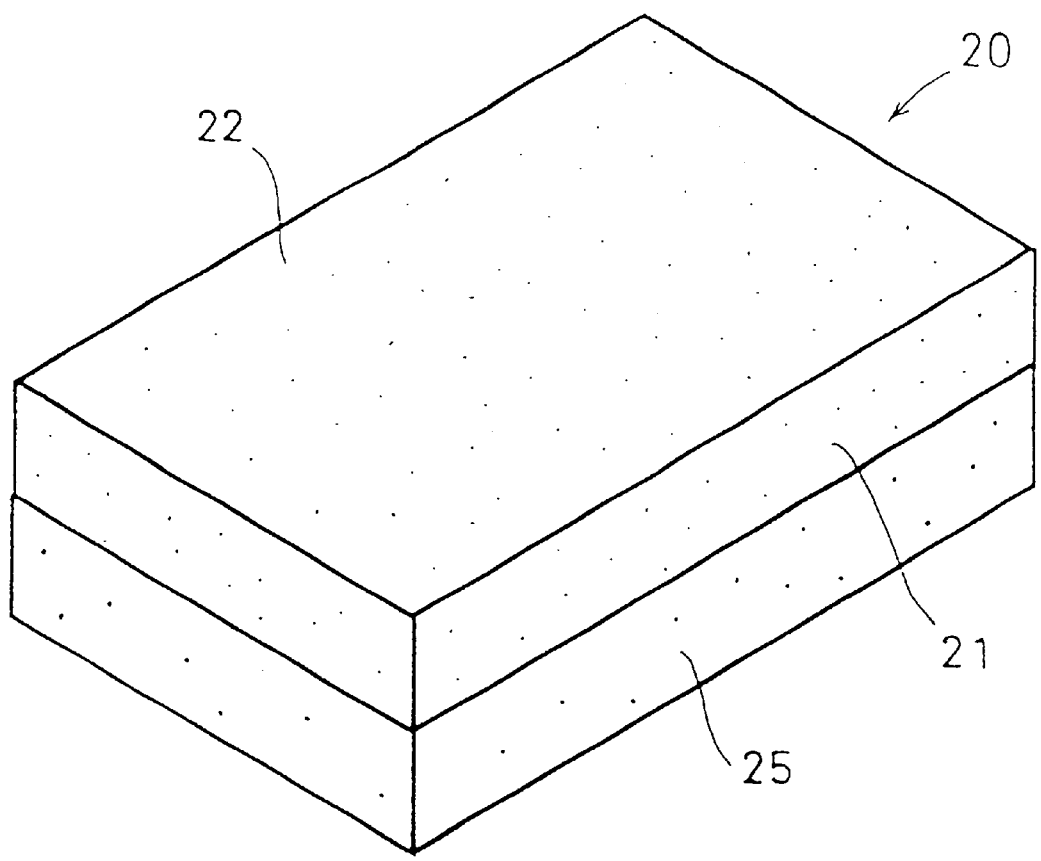
FIG. 2 is a perspective view illustrating a wiping cleaner according to another example of the present invention.

FIG. 1 is a perspective view illustrating a wiping cleaner according to one example of the present invention; and FIG. 2 is a perspective view illustrating a wiping cleaner according to another example of the present invention.

As illustrated in FIG. 1, the wiping cleaner 10 in accordance with one example of the present invention is obtained by forming a porous material having an open-cell structure into a rectangular parallelepiped or another, not-illustrated, desired shape and its surfaces are wiping surfaces 11 to be brought into contact with a surface to be cleaned.

As a material constituting the wiping cleaner 10, a porous one which has a density of 5 to 50 kg/m$^3$ in accordance with JIS K 6401, a tensile strength of 0.6 to 1.6 kg/cm$^2$ in accordance with JIS K 6301, an elongation at break of 8 to 20% in accordance with JIS K 6301 and the cell number of 80 to 300 cells/25 mm as measured in accordance with JIS K 6402; and at the same time has a surface to be peeled in the particle by the friction upon wiping is preferred. As a material having such physical properties, a melamine resin foam is particularly suited. A material having physical properties, particularly tensile strength and elongation at break, within predetermined ranges exhibits proper hardness and brittleness so that good polishing effects are available. The number of cells within a predetermined range brings about good scratching-off effects.

The melamine resin foam is, as already known, prepared from a melamine formaldehyde resin obtained by the reaction between melamine and formaldehyde and a foaming agent. The melamine resin foam has been regarded suitable as a heat insulating material owing to its excellent flame retardancy, but its brittleness due to low tensile strength or tear strength has prevented industrial application of it. With regards to a melamine resin foam, a description can be found in JP-A-53-17697 (the term "JP-A" as used herein means an "unexamined published Japanese patent application), JP-B-2-50943 (the term "JP-B" as used herein means an "examined Japanese patent publication") and JP-A-7-157590.

The melamine resin foam which has physical properties as described above and is used in the present invention has a thin and fine cellular structure, compared with other expanded substances such as polyurethane, cellulose and ethylene vinyl acetate. The melamine resin foam is notably brittle so that by friction, it is separated from its surface and scatters as fine particles. In addition, this melamine resin foam has a three-dimensional network porous substance having an open-cell structure. It has a fine irregular surface. In the wiping cleaner 10 of the invention having this fine irregular surface as a wiping surface 11, when a surface to be cleaned such as a top plate of a desk is rubbed by the wiping surface 11, the scattered particles not only act as an abrasive between the wiping surface 11 and the surface to be cleaned but also friction resistance optimum for stain removal is generated by the fine irregularity of the wiping surface 11, whereby the stains are removed completely from the top plate. The removed stains are held in the fine concave portion of the wiping surface 11 so that traces of wiping do not easily remain on the top plate. Owing to high hardness, the scattered particles act efficiently as an abrasive. Upon wiping, the wiping surface 11 is peeled as fine particles so that a stain-free clean surface always appears as the wiping surface 11 and there is no potential problem that the stain which has remained on the wiping surface adheres and re-stains the cleaned surface.

This wiping cleaner 10 easily contains a liquid such as water or a detergent solution owing to a hydrophilic nature derived from the expanded resin and open-cell structure of the micro cell. When the wiping cleaner having a liquid such as water contained therein is used, synergism of scratching-off effects of the fine cell structure, abrasive effects of the scattered particles and cleaning effects of the liquid brings about notably high cleaning effects.

To 100 parts by weight of the melamine resin foam to be used in the present invention, 1 to 60 parts by weight of an anionic surfactant is preferably added as an emulsifier which functions upon formation of its cells. When the anionic surfactant is added in an amount within the above-described range, it bleeds out to the surface of the wiping cleaner 10 and the surface peel particles with bleeding the anionic surfactant, leading to a further improvement in the cleaning effects. At an amount less than 1 part by weight, a suitable melamine resin foam composed of predetermined number of cells is not available, because sufficient emulsification is not carried out upon cell formation of the melamine resin foam. At an amount exceeding 60 parts by weight, the surface of the wiping cleaner 10 always becomes sticky by the excess anionic surfactant and dusts tend to adhere to the cleaner, which damages handling ease. The addition amount of the anionic surfactant is more preferably from 10 to 55 parts by weight and still more preferably from 20 to 40 parts by weight, per 100 parts by weight of the melamine resin foam.

Examples of the anionic surfactant include alkylbenzene sulfonate salts, alkylphenyl sulfate ester salts, higher alcohol sulfate ester salts and sulfosuccinate salts. Specific examples include linear dodecylbenzenesulfonate sodium, coconut oil-reduced alcohol sulfate ester sodium ($C_{12}H_{25}OSO_3Na$), beef-tallow-reduced alcohol sulfate ester sodium ($C_{16}H_{33}OSO_3Na$, $C_{18}H_{37}OSO_3Na$).

In the melamine resin foam, a detergent assistant may also be incorporated to heighten its detergency. It is preferably added in an amount of 0 to 60 parts by weight per 100 parts by weight of the melamine resin foam. This detergent assistant is a compound having effects for lowering the micelle limit concentration or sequestering effects (water softening effects) and is what is called "builder". As the detergent assistant, either of an inorganic compound or an organic compound can be used. Specific examples include zeolite, carboxymethyl cellulose, sodium carbonate, sodium tripolyphosphate, potassium pyrophosphate, sodium silicate and sodium polyacrylate. The detergent assistant is selected so as to exhibit high synergism when used with the anionic surfactant in combination. For example, sodium tripolyphosphate or sodium silicate is preferred when sodium alkylbenzene sulfonate (ABS) or EO-added nonyl phenol is used, while zeolite or carboxymethyl cellulose is preferred when sodium linear alkylbenzene sulfonate (LAS) or sodium higher-alcohol alkylsulfate ester is used. The detergent assistant in an amount equal to that of the anionic surfactant brings about sufficient effects and amounts exceeding it have no good influence on the cleaning efffects. Accordingly, the addition amount of the detergent assistant is more preferably from 10 to 55 parts by weight and still more preferably from 20 to 40 parts by weight, per 100 parts by weight of the melamine resin foam.

To the melamine resin foam of the present invention, other additives such as a blowing agent, a curing agent and a latent curing agent may also be added Examples of the blowing agent include hydrocarbons, halogenated hydrocarbons, alcohols, ketones, ethers and esters. Among them, pentane and hexane are particularly preferred. Further, trichlorotrifluoromethane and trichlorofluoroethane may also be included. As to the addition amount of the blowing agent, although it depends on the expansion ratio, it is generally from 1 to 30% by weight of the melamine resin foam.

Examples of the curing agent include inorganic acids and organic acids. Specific examples include hydrochloric acid, sulfuric acid, phosphoric acid, formic acid, acetic acid, oxalic acid, lactic acid, amino acid, etc.

Examples of the latent curing agent include halogenated carboxylic acid salts, chloroacetic acid amides, phosphates, acid anhydrides, and ammonium salts. These compounds are added after the completion of bubble forming reaction capable of generating blowing gas, as curing accelerators or pH adjusting agents.

EXAMPLES

A description will next be made of the wiping cleaner obtained in Examples 1 to 3 and Comparative Examples 1 to 3. These wiping cleaners are equal in the amount of the below-described components (1) and (3) to (5), but differ in the amounts of (2) sodium dodecylbenzene sulfonate and (6) sodium tripolyphosphate. The amounts of (2) and (6) are shown, together with the physical property values and cleaning effects, in Table 1. The cleaning effects were the results of the use of the melamine resin foam in the form of 110×70×15 mm obtained in Examples and Comparative Examples for various articles. The cleaning effects of the cloth duster and flexible polyurethane foam as conventional products were also studied. In the below-described table, the term "dry wiping" means wiping without being soaked in a liquid such as water and the term "wet wiping" means wiping after being soaked in water. The removing degree of the stains are ranked as follows: "A" when the stains are removed completely, "B" when most of the stains are removed, "C" when stains still remain, and "D" when stains are not removed.

Composition Example of the Melamine Resin Foams in Examples and Comparative Examples

| (1) Melamine-formaldehyde condensate | 100 parts by weight |
| (2) Sodium dodecylbenzenesulfonate | see Table 1 |
| (3) Pentane | 8 parts by weight |
| (4) Ammonium chloride | 10 parts by weight |
| (5) Oxalic acid | 3 parts by weight |
| (6) Sodium tripolyphosphate | see Table 1 |

| | | | Ex. 1 | Ex. 2 | Ex. 3 | Comp. Ex. 1 | Comp. Ex. 2 | Comp. Ex. 3 | Cloth duster | Flexible poly urethane | Hard poly urethane |
|---|---|---|---|---|---|---|---|---|---|---|---|
| Sodium dodecylbenzenesulfonate | | | 50 | 50 | 3 | 0.5 | 65 | 50 | — | — | — |
| Sodium tripolyphosphate | | | 4 | 50 | — | 10 | 10 | 70 | — | — | — |
| Foaming state | | | Good | Good | Good | Poor | Slightly poor | Slightly poor | — | — | — |
| Density (kg/m$^3$) | | | 9 | 20 | 11 | 70* | 20 | 50 | — | 30 | 52* |
| Tensile strength (kg/cm$^2$) | | | 1.5 | 0.9 | 1.2 | 1.6 | 2.0* | 0.8 | — | 1.6 | 4.3* |
| Elongation at break (%) | | | 18 | 9 | 13 | 10 | 20 | 8 | — | 200* | 3* |
| The number of cells (cells/25 mm) | | | 200 | 90 | 125 | 70* | 170 | 30* | — | 50* | 90 |
| Cleaning effects | Oil-stuck domestic fan | dry wiping | A | A | B | C | D | D | D | D | D |
| | | wet wiping | B | A | B | C | B | C | C | C | D |
| | Mud-stuck auto mobile body | dry wiping | A$^{(1)}$ | A$^{(1)}$ | A$^{(1)}$ | C | D | C | C | C | D |
| | | wet wiping | A | A | A | D | A | C | B$^{(3)}$ | B$^{(3)}$ | C |
| | Dust-stuck top plate of a desk | dry wiping | A | A | A | C | D | D | C | C | D |
| | | wet wiping | A$^{(2)}$ | A$^{(2)}$ | A$^{(2)}$ | C | B | D | B$^{(4)}$ | B$^{(4)}$ | C |

In Table 1:
(1) means "there was no trace of wiping", (2) means "there was no trace of wiping" and "luster appeared on the top plate", (3) means "there remained a trace of wiping" and (4) means "there remained a trace of wiping" and "the plate was still darkish".

The density was measured in accordance with JIS K 6401, tensile strength and elongation at break were measured in accordance with JIS K 6301, and the number of cells were counted in accordance with JIS K 6402.

* indicates that the values are outside the range as specified in the present invention.

From the results of the cleaning effects of the resins obtained in Examples 1, 2 and 3, it has been understood that a slight lowering in cleaning effects appeared when a detergent assistant ((6) sodium tripolyphosphate) was not added, but a change in the amount of the detergent assistant had no influence on the cleaning effects. The resin obtained in comparative Example 1 was not suited for practical use, because owing to a small amount of sodium dodecylbenzenesulfonate, the cell was comparatively coarse and foam was hard and markedly fragile. In Comparative Example 2, owing to the surfactant contained in a large amount, the surface of the expanded resin became sticky. In Comparative Example 3, addition of a detergent assistant in a large amount prevents the preparation of a good expanded resin suited for practical use.

The wiping cleaner 20 as illustrated in FIG. 2 relates to one embodiment of the present invention. It comprises a melamine resin foam 21 and a grip portion 25 adhered to one of the surfaces of the melamine resin foam with an adhesive.

The surfaces to which the grip portion has not been adhered serves as a wiping surface 22. In this case, the grip portion 25 is adhered to one of the surfaces of the melamine resin foam 21 in the form of a rectangular parallelepiped having a predetermined height (thickness) and the whole wiping cleaner also takes the shape of a rectangular parallelepiped.

The grip portion 25 is a portion to be grasped by a user upon using this wiping cleaner 20. This grip portion protects the melamine resin foam 21 inferior in strength from direct grasping and in addition, it makes it possible to easily apply the optimum force necessary for cleaning to the wiping surface 22 of the melamine resin foam 21. This grip portion 25 may be in the block form made of a hard plastic such as polypropylene or may have a band to insert a hand between the grip portion and the band like a conventionally used chalk eraser.

Particularly preferred is a grip portion which permits deformation of the wiping cleaner 20 in accordance with the shape of the surface to be cleaned, for example, a curved surface, and permits the contact of the wiping surface 22 of the melamine resin foam 21 at a larger area. As a grip portion which can satisfy it, that made of an elastic foam is preferred. As the elastic form constituting the grip portion 25, those having higher tensile strength and tear strength than the melamine resin foam 21, such as flexible polyurethane foam, expanded polypropylene and expanded polyethylene are preferred. The wiping cleaner 20 in this drawing has a grip portion 25 made of flexible urethane foam having a density of about 30 kg/m$^3$ and hardness of about 20 kg and it takes the form of a rectangular parallelepiped of 110×70×35 mm, in which the melamine resin foam 21 has a thickness of 15 mm and the grip portion 25 has a thickness of 20 mm.

As described above with reference to accompanying drawings, the wiping cleaner according to the present invention is made of a melamine resin foam, which has not been used industrially so far because of the problem in strength. Owing to low strength, minute irregularity on the surface and easy absorption of a liquid such as water, the melamine resin foam hardly scratches the surface to be cleaned, has excellent effects for removing stains without leaving a trace of wiping and exhibits lustering effects as compared with the conventional wiping cleaners such as a dust cloth and flexible polyurethane foam, thus having excellent effects. In addition, since it does not easily scratch the surface to be cleaned, it can be used widely for not only furniture or automobiles, but also tableware or the like. Since it does not leave a trace of wiping, it can be used suitably for mirror-finished surface. In addition, finishing wiping for removal of the trace of wiping is not necessary, which simplifies the work.

The wiping cleaner having a grip portion attached to the melamine resin foam makes it possible to carry out cleaning with efficiency while suppressing the damage of the melamine resin foam, because the melamine resin foam is not grasped directly.

While the invention has been described in detail and with reference to specific embodiments thereof, it will be apparent to one skilled in the art that various changes and modifications can be made therein without departing from the spirit and scope thereof.

What is claimed is:

1. A wiping cleaner composed of a porous material of an open-cell structure which has a density of 5 to 50 kg/m$^3$, a tensile strength of 0.6 to 1.6 kg/cm$^2$, an elongation at break of 8 to 20%, a cell number of 80 to 300 cells/25 mm, and 1 to 60 parts by weight of an anionic surfactant per 100 parts by weight of the porous material, and which has a fine irregular wiping surface wherein upon wiping, particles are peeled from the wiping surface by friction.

2. The wiping cleaner according to claim 1, wherein the porous material is a melamine resin foam.

3. The wiping cleaner according to claim 2, further comprising a detergent assistant.

4. The wiping cleaner according to claim 3, wherein the detergent assistant is contained in an amount of 60 parts by weight or less per 100 parts by weight of the melamine resin foam.

5. A wiping cleaner composed of a porous material of an open-cell structure and a grip portion fixed to a first surface of the porous material, wherein said porous material has a density of 5 to 50 kg/m$^3$, a tensile strength of 0.6 to 1.6 kg/cm$^2$, an elongation at break of 8 to 20%, and cell number of 80 to 300 cells/25 mm and which has a second surface to which the grip portion has not been fixed and which is a fine irregular wiping surface wherein upon wiping, particles are peeled from the wiping surface by friction.

6. The wiping cleaner according to claim 5, wherein the porous material is a melamine resin foam.

7. The wiping cleaner according to claim 6, wherein the grip portion is made of an elastic foam having a strength higher than the melamine resin foam.

8. The wiping cleaner according to claim 6, further comprising 1 to 60 parts by weight of an anionic surfactant per 100 parts by weight of the melamine resin foam.

9. The wiping cleaner according to claim 8, further comprising a detergent assistant.

10. The wiping cleaner according to claim 9, wherein the detergent assistant is contained in an amount of 60 parts by weight or less per 100 parts by weight of the melamine resin foam.

* * * * *